UNITED STATES PATENT OFFICE.

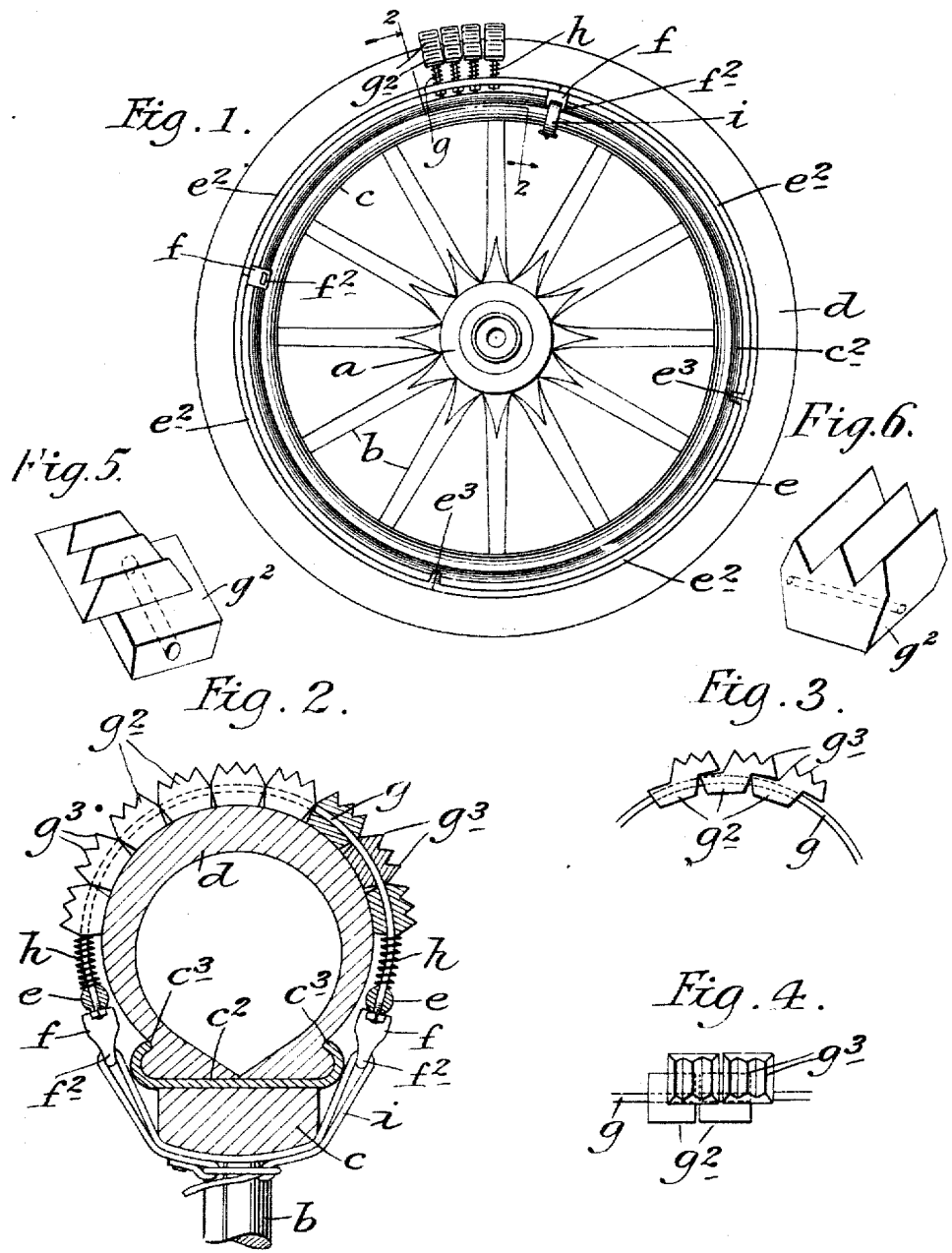

CHRISTOPHER REICHEL, OF AMSTERDAM, NEW YORK.

PROTECTION AND ANTISKIDDING ARMOR FOR PNEUMATIC TIRES.

1,012,159.     Specification of Letters Patent.     Patented Dec. 19, 1911.

Application filed November 16, 1910. Serial No. 592,607.

*To all whom it may concern:*

Be it known that I, CHRISTOPHER REICHEL, a citizen of the United States, and residing at Amsterdam, in the county of Montgomery and State of New York, have invented certain new and useful Improvements in Protection and Antiskidding Armor for Pneumatic Tires, of which the following is a specification, such as will enable those skilled in the art to which it appertains to make and use the same.

This invention relates to pneumatic tires, and the object thereof is to protect tires of this class when used on the wheels of automobiles, and also to prevent the wheels of automobiles from skidding; and the invention consists of new and useful devices of the class and for the purpose specified constructed and applied as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of an automobile wheel provided with my improvement; Fig. 2 a section on the line 2—2 of Fig. 1; Fig. 3 a side view of a number of my improved tire protecting and anti-skidding devices detached from the wheel and showing the modified form of construction; Fig. 4 a plan view showing a modified form of the devices shown in Fig. 3, and;— Figs. 5 and 6 perspective views of detached tread blocks which I employ.

In the drawing forming part of this specification I have shown a wheel comprising a hub $a$, spokes $b$ and rim $c$. The rim $c$ consists of two parts or is provided with an annular plate member $c^2$ having inwardly curved side flanges $c^3$, by which the pneumatic tire $d$ is held in place in the usual manner and all these parts may be of the usual or any preferred form or construction.

In the practice of my invention I provide two rings $e$ which are of less diameter than the pneumatic tire $d$ and which are supported at the opposite sides thereof, and these rings $e$ are composed of separate parts $e^2$ provided at their ends with inwardly directed lugs or projections $e^3$ which are semicircular in cross section and threaded, and screwed thereonto are nuts $f$ by which the separate parts $e^2$ of the rings $e$ are secured together and practically formed into a continuous ring. The rings $e$ are connected by flexible devices $g$, consisting preferably of rods and which are passed around the outer or bearing portion of the tire $d$, and mounted on each of said flexible devices or rods are a plurality of bearing or tread blocks $g^2$ preferably provided with teeth $g^3$ which range, in the form of construction shown, transversely of the tire. Placed between the blocks $g^2$ and the rings $e$, in the form of construction shown, are spiral springs $h$ which serve to press said blocks together and said blocks may be composed of any preferred material, preferably metal. The nuts $f$ by which the separate parts $e^2$ of the rings $e$ are connected are provided with loops, rings or eyes $f^2$, through which are passed straps $i$ which are buckled or otherwise secured over or around the rim $c$, as clearly shown in Fig. 2, and in practice the parts $g$ and the blocks $g^2$ mounted thereon, may be placed close enough together as shown in Fig. 1 to form a continuous bearing surface for the tire $d$. The tread blocks may be made so that they abut simply as shown at $g^2$ in Figs. 1, 2 and 6, or they may be formed as shown at $g^4$ in Figs. 3, 4 and 5, in which form they consist of rectangular bottom portions and rectangular top portions, the top part of each block covering one corner portion of the bottom part thereof, and with this form of construction the said tread blocks overlap transversely of the tire and circumferentially thereof as shown in Figs. 3 and 4. This construction, as will be shown, forms when the blocks $g^2$ are pressed together, a complete armor for the outer or bearing surface of the tire and said tire will be protected at all times against puncture or other injury, and when the said blocks are provided with teeth $g^3$ as shown, they will also prevent skidding and changes in and modifications of the construction herein described may be made, within the scope of the appended claim, without departing from the spirit of my invention or sacrificing its advantages.

Having fully described my invention, what I claim as new and desire to secure by Letters Patent, is;—

The herein described device for protecting pneumatic tires, comprising rings of less diameter than the tire, devices connected with said rings and passing around the bearing surface of the tire transversely thereof, tread members mounted on said devices and spiral springs placed between said tread
5 members and said rings.

In testimony that I claim the foregoing as my invention I have signed my name in presence of the subscribing witnesses this 12th day of November, 1910.

CHRISTOPHER REICHEL.

Witnesses:
L. A. SERVISS,
ARCHIE R. CONOVER.